(12) United States Patent
Iwasaki et al.

(10) Patent No.: US 8,419,264 B2
(45) Date of Patent: Apr. 16, 2013

(54) PLANAR LIGHTING DEVICE

(75) Inventors: Osamu Iwasaki, Shizuoka (JP);
Toshiaki Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 358 days.

(21) Appl. No.: 12/449,188

(22) PCT Filed: Jan. 21, 2008

(86) PCT No.: PCT/JP2008/050709
§ 371 (c)(1),
(2), (4) Date: Jul. 27, 2009

(87) PCT Pub. No.: WO2008/093556
PCT Pub. Date: Aug. 7, 2008

(65) Prior Publication Data
US 2010/0020568 A1    Jan. 28, 2010

(30) Foreign Application Priority Data
Jan. 31, 2007    (JP) ................................. 2007-020721

(51) Int. Cl.
*G02B 6/10*    (2006.01)
(52) U.S. Cl.
USPC ............................ 362/625; 362/612; 362/628
(58) Field of Classification Search .................. 362/612, 362/623–626, 628
See application file for complete search history.

(56) References Cited

U.S. PATENT DOCUMENTS

| 5,966,192 A | 10/1999 | Higuchi et al. |
| 5,993,020 A | 11/1999 | Koiki |
| 6,167,182 A | 12/2000 | Shinohara et al. |
| 6,217,184 B1 * | 4/2001 | Koike et al. .................... 362/606 |
| 6,257,737 B1 * | 7/2001 | Marshall et al. ............... 362/231 |
| 2005/0180167 A1 * | 8/2005 | Hoelen et al. ................. 362/613 |
| 2006/0120110 A1 * | 6/2006 | Lin et al. ........................ 362/615 |
| 2007/0253218 A1 | 11/2007 | Tanabe |

FOREIGN PATENT DOCUMENTS

| CN | 1643409 A | 7/2005 |
| JP | 7-36037 | 2/1995 |
| JP | 07-198956 A | 8/1995 |
| JP | 8-248233 | 9/1996 |
| JP | 8-271739 | 10/1996 |
| JP | 11-153963 | 6/1999 |
| JP | 2002-122864 A | 4/2002 |
| JP | 2005-524194 | 8/2005 |
| JP | 2006-294343 | 10/2006 |
| WO | WO 98/19105 | 5/1998 |
| WO | WO 2006/027883 | 3/2006 |

* cited by examiner

*Primary Examiner* — Jong-Suk (James) Lee
*Assistant Examiner* — Leah S Macchiarolo
(74) *Attorney, Agent, or Firm* — Jean C. Edwards, Esq; Edwards Neils PLLC

(57) ABSTRACT

A planar lighting device includes: a light source that emits light; and a light guide plate disposed opposite the light source in which light emitted from the light source enters and is emitted therefrom as planar light. The light guide plate includes a flat light exit plane that emits the planar light, a light entrance plane that is formed opposite the light source and includes one side of the light exit plane, an end plane that includes the opposite side to the one side of the light exit plane, and a rear plane formed on the side opposite the light exit plane. The rear plane includes a first rear plane that is joined with the end plane and is smoothly inclined to said light exit plane so that the distance from the light exit plane increases as the distance from the end plane increases, and a second rear plane.

6 Claims, 9 Drawing Sheets

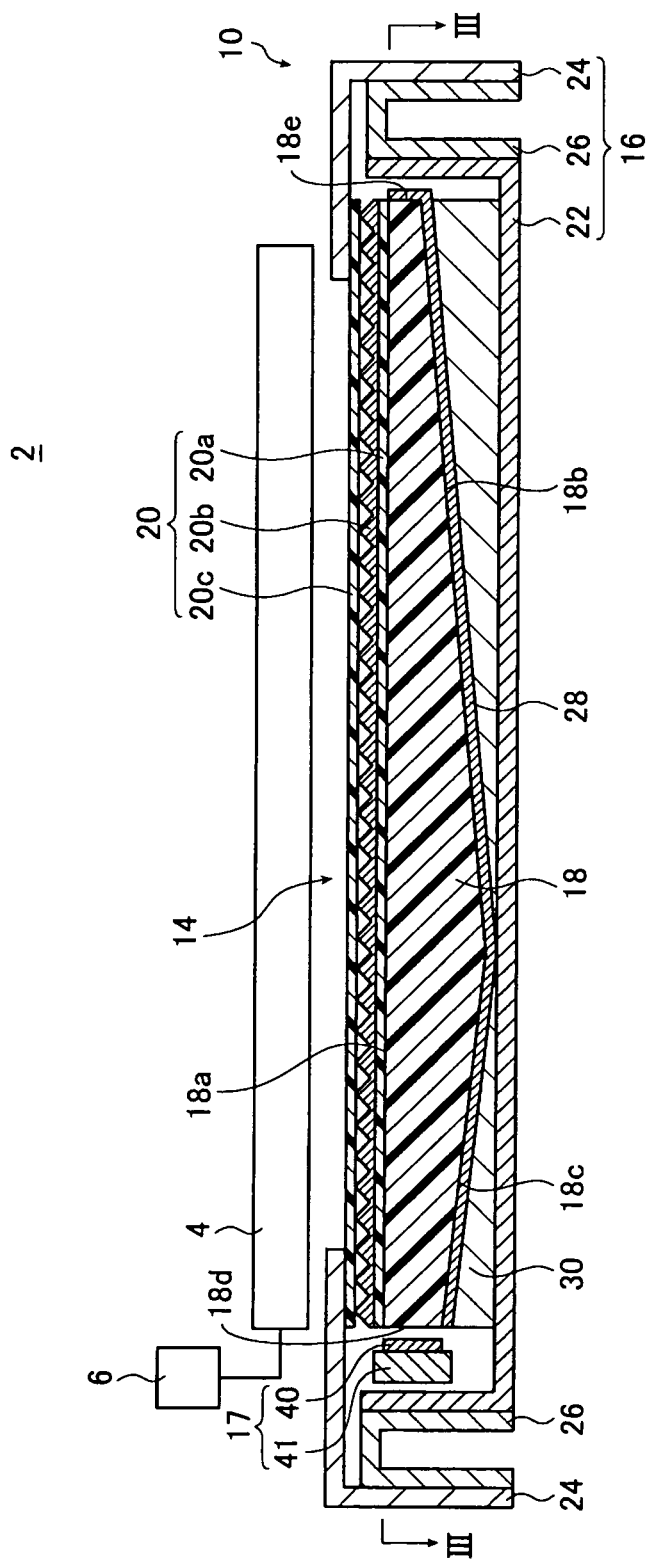

PLANAR LIGHTING DEVICE

CROSS-REFERENCE TO RELATED APPLICATIONS

The present invention is a 35 USC 371 national stage entry of PCT/JP2008/050709, filed Jan. 21, 2008, which claims priority from Japanese Patent Application No. 2007-020721, filed Jan. 31, 2007, the contents of all of which are herein incorporated by reference in their entirety.

TECHNICAL FIELD

The present invention relates to a planar lighting device configured to light indoor and outdoor areas, or a planar lighting device used as a backlight that illuminates a liquid crystal panel of a liquid crystal display unit or as a backlight of an advertisement panel, advertisement tower, or sign, which comprises a linear light source or a light source disposed in a linear shape, and a light guide plate configured to emit incident light emitted by the light source through a planar light exit plane.

BACKGROUND ART

A liquid crystal display device is provided with a backlight unit for irradiating a liquid crystal panel (LCD) with light from its rear side and illuminating the liquid crystal panel.

At present, a so-called bottom-lighting backlight unit is the mainstream for a large-sized liquid crystal television (refer to JP 07-36037 A, for example). The bottom-lighting backlight unit comprises a configuration wherein a plurality of cathode ray tubes serving as a light source is arranged on the rear surface of a liquid crystal panel, illuminating the liquid crystal panel with the inner area of the housing where the cathode ray tubes are arranged therein serving as a white reflection surface. Nevertheless, in this method, to ensure uniform light distribution, the thickness in the direction orthogonal to the liquid crystal panel needs to be about 30 mm, in principle.

In recent years, while there has been demand for a liquid crystal display device with reduced thickness, reduced power consumption, and increased size, the aforementioned bottom-lighting backlight unit has been limited in terms of reduced thickness due to the unevenness in brightness that occurs when the thickness thereof is reduced to 10 mm or less.

Among backlight units that allow reduction of thickness thereof is a backlight unit using a light guide plate in which light emitted by an illumination light source and entering the light guide plate is guided in given directions and emitted through a light exit plane that is different from the plane through which light entered.

There has been proposed a backlight unit of a type described above using a light guide plate formed by mixing scattering particles for diffusing light into a transparent resin (refer to JP 07-36037 A, JP 08-248233 A, JP 08-271739 A, and JP 11-153963 A, for example).

JP 07-36037 A, for example, discloses a light-diffusion light-guide light source device comprising a light-diffusion light guide member having at least one light entrance plane region and at least one light exit plane region and light source means for entering light through the light entrance plane region, the light-diffusion light guide member having a region that has a tendency to decrease in thickness with the increasing distance from the light entrance plane.

JP 08-248233 A discloses a planar light source device comprising a light-diffusion light guide member, a prism sheet provided on the side of the light-diffusion light guide member closer to a light exit plane, and a reflector provided on the rear side of the light-diffusion light guide member. JP 08-271739 A discloses a liquid crystal display comprising a light emission direction correcting element formed of sheet optical materials provided with a light entrance plane having a repeated undulate pattern of prism arrays and a light exit plane given a light diffusing property. JP 11-153963 A discloses a light source device comprising a light diffusion light guide member having a scattering power therein and light supply means for supplying light through an end plane of the light diffusion light guide member.

In the planar lighting devices provided with a light-diffusion light guide plate containing light scatterers mixed therein as disclosed in JP 07-36037 A, JP 08-248233 A, JP 08-271739 A and JP 11-153963 A, light emitted by the light source and entered the light-diffusion light guide member through the light entrance plane into receives a single or a multiple scattering effect at a given rate as the light propagates through the inside of the light-diffusion light guide member. Moreover, a significant proportion of light that reaches both end planes of the diffusion light guide member or a surface of the reflector receives a reflection effect and is returned back into the diffusion light guide member.

The above composite process produces a light beam that is emitted through the light exit plane highly efficiently with a directivity to travel obliquely forward as viewed from the light source. Briefly, light radiated by the light source is emitted from the light exit plane of the light diffusion light guide member.

Thus, the prior art literature mentioned above purportedly states that a light guide plate containing scattering particles mixed therein is capable of emitting uniform light with a high light emission efficiency.

Further, in JP A 11-153963, there have been disclosed a light guide plate in the form of a flat plate and a light guide plate composed of a portion shaped to have a region with a tendency to grow thinner with the increasing distance from the light entrance plane attached to the other portion, in addition to the light guide plate mentioned above that is shaped to have a region with a tendency to grow thinner with the increasing distance from the light entrance plane.

Patent Document 1: JP 07-36037 A
Patent Document 2: JP 08-248233 A
Patent Document 3: JP 08-271739 A
Patent Document 4: JP 11-153963 A

DISCLOSURE OF THE INVENTION

Problems to be Solved by the Invention

However, to achieve increased dimensions with the planar lighting device using any of the light guide plates disclosed in JP 07-36037 A, JP 08-248233 A, JP 08-271739 A and JP 11-153963 A, light needs to travel a longer distance from the light source, which in turn requires the light guide plate itself to be made thicker. Thus, an attempt to enlarge a display screen or a display area of a planar lighting device is confronted with difficulties in reducing the thickness and the weight of the planar lighting device.

It is therefore a first object of the present invention to resolve the above-described problems of prior art and provide a planar lighting device capable of emitting illumination light having reduced or no brightness unevenness and of achieving increased dimensions by using with high efficiency a light emitted by a light source.

Further, in addition to the aforementioned object, it is a second object of the present invention to provide a planar lighting device capable of achieving reduced thickness and reduced weight as well as emission of illumination light having greater light intensity.

Means to Solve the Problems

In order to solve the above problems, the present invention provides a planar lighting device comprising: a light source that emits light; and a light guide plate disposed opposite the light source in which light emitted from the light source enters and is emitted therefrom as planar light, wherein: the light guide plate comprises a flat light exit plane that emits the planar light, a light entrance plane that is formed opposite the light source and includes one side of the light exit plane, an end plane that includes the opposite side to the one side of the light exit plane, and a rear plane formed on the side opposite the light exit plane; the rear plane comprises a first rear plane that is joined with the end plane and is inclined so that the distance from the light exit plane increases as the distance from the end plane increases, and a second rear plane that is joined with the first rear plane and is joined with the light entrance plane; and the first rear plane and the second rear plane are joined so as to form a joining line where the distance from the joining line to the light entrance plane is shorter than the distance from the joining line to the end plane, and the distance between the light exit plane and the rear plane is greatest at the joining line.

Preferably, the light entrance plane and the end plane of the light guide plate are orthogonal to the light exit plane and the length of the light entrance plane is longer than the length of the end plane in the direction orthogonal to the light exit plane.

It is preferable that the light guide plate satisfies the inequality of $1/3 \leq L_1/L_2 \leq 2/3$, given a length $L_1$ from the joining line to the light entrance plane and a length $L_2$ from the joining line to the end plane, in the direction orthogonal to the one side and parallel to the light exit plane.

Preferably, the second rear plane of the light guide plate has a shape that inclines from the light entrance plane toward the joining line so that the distance from the light exit plane increases.

Preferably, the light guide plate is formed so that a part on the side of the first rear plane closer to the joining line and a part on the side of the second rear plane closer to the joining line each have a curved shape with an arbitrary point on a plane that passes through the joining line and is orthogonal to the light exit plane as its center; and the light guide plate satisfies the inequality $R_1 < R_2$, given a radius of curvature $R_1$ of the curved shape of the first rear plane, and a radius of curvature $R_2$ of the curved shape of the second rear plane.

It is also preferable that the second rear plane of the light guide plate is formed parallel to the light exit plane.

Preferably, the light guide plate includes a plurality of scattering particles P in its interior and, given a density $N_p$ of the scattering particles a distance L from the light entrance plane to the end plane in the incident direction, a length D1 of the light entrance plane in the direction orthogonal to the light exit plane, a distance D2 between the joining line and the light exit plane in the direction orthogonal to the light exit plane, and a length D3 of the end plane in the direction orthogonal to the light exit plane, satisfies the following inequalities:

27/100000<(D2−D1)/$L_1$<26/1000

27/100000<(D2−D3)/$L_2$<26/1000 and 0.04 Wt %<$N_p$<0.25 Wt %.

It is preferable that the light guide plate includes a plurality of scattering particles in its interior and, given a scattering cross-section Φ of the scattering particles, a density $N_P$ of the scattering particles, a compensation coefficient $K_C$, and a length L from the light entrance plane to the end plane in the incident direction, satisfies the following inequalities:

1.1≤Φ·$N_P$·L·$K_C$≤8.2 and 0.005≤$K_C$≤0.1.

Preferably, the light source comprises a plurality of LED chips and a mount that supports the LED chips; and the LED chips are arranged in arrays on the plane opposite the light entrance plane of the mount. Further, it is preferable that each of the LED chips satisfies the inequality b>a, given a length "a" in the thickness direction of the light guide plate and a length "b" in the direction orthogonal to the thickness direction of the light guide plate.

Effects of the Invention

According to the present invention, the above-described configuration makes it possible to utilize light emitted by a light source with high efficiency and emit light having reduced or no brightness unevenness through a light exit plane.

Further, according to the present invention, it is possible to provide a planar lighting device capable of achieving and suitably using a bell-shaped brightness distribution of light emitted through a light exit plane in a liquid crystal display device, such as a liquid crystal television.

Furthermore, it is possible to provide a planar lighting device capable of achieving an increased surface area of the light entrance plane without increasing the thickness of the light guide plate, and of achieving reduced thickness and reduced weight while emitting illumination light having a greater light intensity through the light exit plane.

BRIEF DESCRIPTION OF THE DRAWINGS

FIG. 2 is a cross-sectional view of the liquid crystal display device illustrated in FIG. 1 taken along line II-II.

Figure 1:
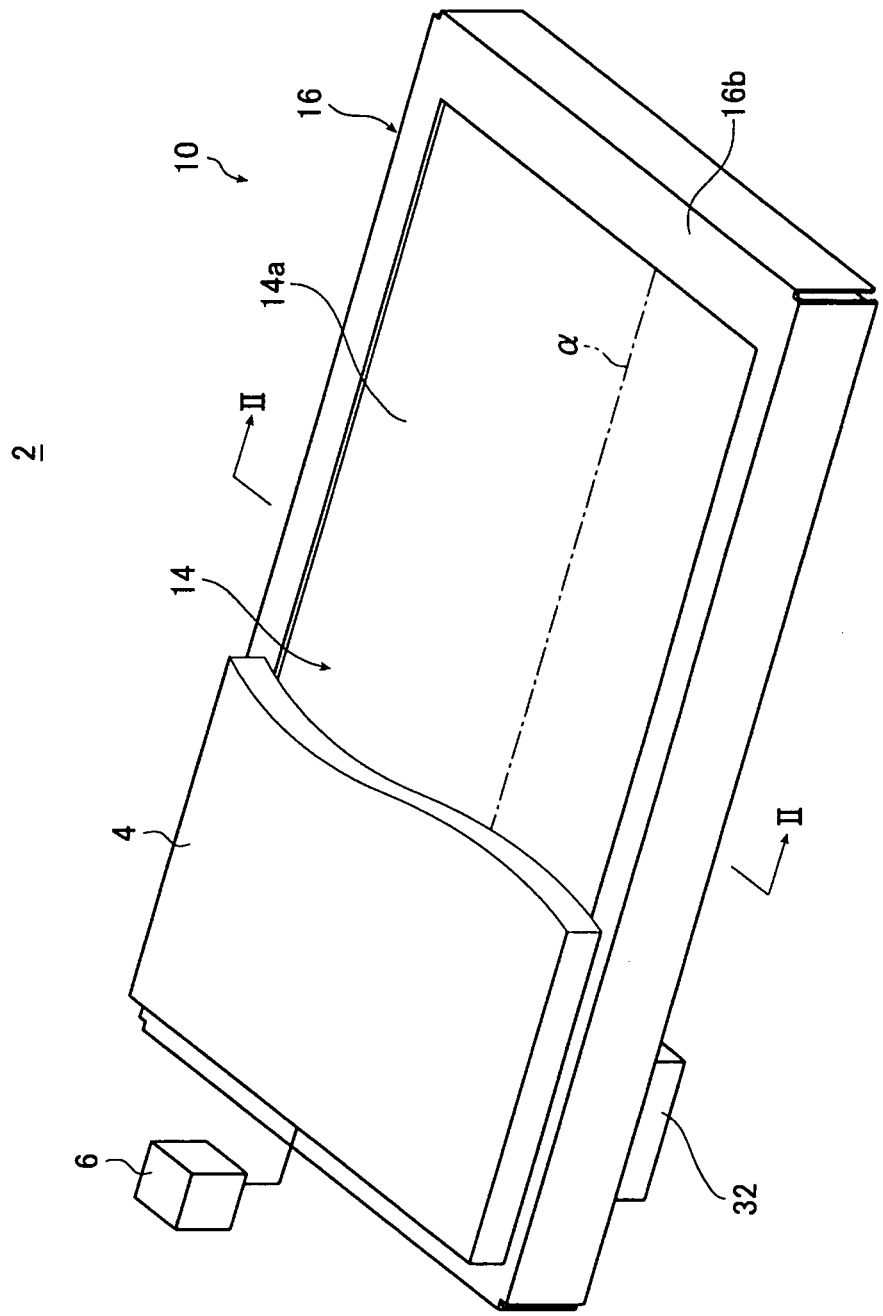
FIG. 1 is a schematic perspective view illustrating an embodiment of a liquid crystal display device using the planar lighting device of the invention.

DESCRIPTION OF SYMBOLS 2 liquid crystal display device
4 liquid crystal display panel
6 drive unit
10, 60 planar lighting device
14, 62 lighting device main body
14a light exit plane
16 housing
17, 67, 84 light source
18, 58, 68 light guide plate
18a, 68a light exit plane
18b, 58b first inclined plane
18c, 58c second inclined plane
18d, 68d light entrance plane
18e, 68e end plane
20 optical member unit
20a, 20c diffusing sheet
20b prism sheet
22 lower housing
22a bottom section
22b lateral section
24 upper housing
24a opening
26 turnup member
28, 74 reflection plate
30, 70 light guide plate mount
32 power unit casing
40, 80 LED chip
40a light emission surface
41, 81 light source mount
42 array base
44 fin
46 LED array
68b first rear plane
68c second rear plane
90a first line
90b first arc
90c second arc
90d second line

BEST MODE FOR CARRYING OUT THE INVENTION

The planar lighting device of the invention will be described in detail below referring to an embodiment illustrated in the accompanying drawings.

FIG. 1 is a schematic perspective view illustrating a liquid crystal display device provided with the planar lighting device of the invention; FIG. 2 is a cross-sectional view of the liquid crystal display device illustrated in FIG. 1 taken along line II-II.

Figure 3A:
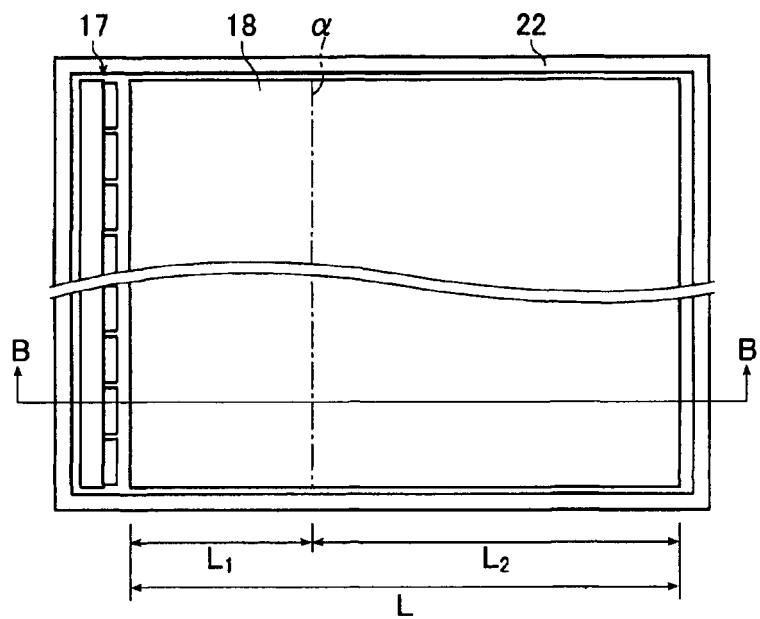
FIG. 3A is a view of an example of the planar lighting device illustrated in FIG. 2 taken along line III-III.
Figure 3B:
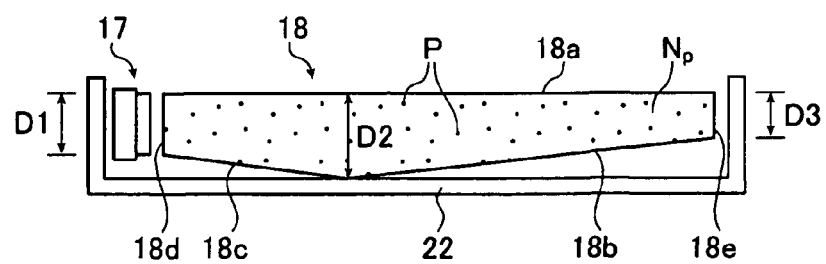
FIG. 3B is a cross-sectional view of FIG. 3A taken along line B-B.

FIG. 3A is a view of an example of the planar lighting device illustrated in FIG. 2 taken along line III-III; and FIG. 3B is a cross-sectional view of FIG. 3A taken along line B-B.

A liquid crystal display device 2 comprises a planar lighting device 10, a liquid crystal display panel 4 disposed on the side of the planar lighting device 10 closer to the light exit plane, and a drive unit 6 for driving the liquid crystal display panel 4. In FIG. 1, part of the liquid crystal display panel 4 is not shown to better illustrate the configuration of the planar lighting device 10.

In the liquid crystal display panel 4, an electric field is partially applied to liquid crystal molecules, previously arranged in a given direction, to change the orientation of the molecules. The resultant changes in refractive index in the liquid crystal cells are used to display characters, figures, images, etc., on the liquid crystal display panel 4.

The drive unit 6 applies a voltage to transparent electrodes in the liquid crystal display panel 4 to change the orientation of the liquid crystal molecules, thereby controlling the transmittance of the light transmitted through the liquid crystal display panel 4.

The planar lighting device 10 is a lighting device for illuminating the whole surface of the liquid crystal display panel 4 from behind the liquid crystal display panel 4 and comprises a light exit plane having substantially the same shape as the image display surface of the liquid crystal display panel 4.

The planar lighting device 10 according to the present invention comprises a lighting device main body 14 including a light source 17, a light guide plate 18, a reflection plate 28, and an optical member unit 20; a housing 16 including a lower housing 22, an upper housing 24, and a turnup member 26; and a light guide plate mount 30 disposed between the lower housing 22 and the reflection plate 28. As illustrated in FIG. 1, a power unit casing 32 is provided on the underside of the lower housing 22 of the housing 16 to hold a plurality of power supply units that supply the light source 17 with electrical power.

Now, the components that make up the planar lighting device 10 will be described.

The lighting device main body 14 comprises the light source 17 that emits light, the light guide plate 18 that emits light emitted by the light source 17 as planar light, the reflection plate 28 that reflects light leaked from the light guide plate 18 so that the leaked light is once again entered into the light guide plate 18, and the optical member unit 20 that scatters and diffuses the light emitted through the guide light plate 18 so as to achieve light with less unevenness.

First, the light source 17 will be described.

Figure 4A:
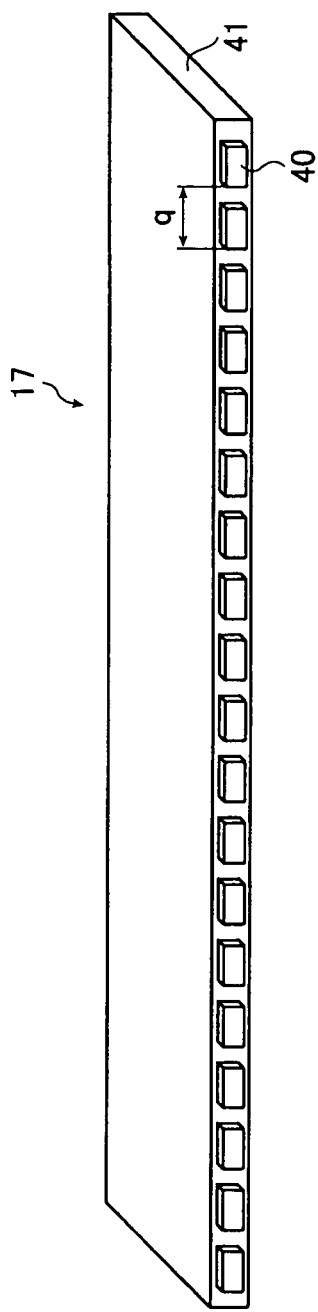
FIG. 4A is a schematic perspective view illustrating the configuration of the light source of the planar lighting device illustrated in FIG. 1 and FIG. 2.
Figure 4C:
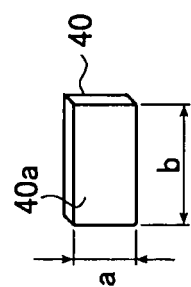
FIG. 4C is a schematic perspective view illustrating one LED of the light source illustrated in FIG. 4A as enlarged.
Figure 4B:
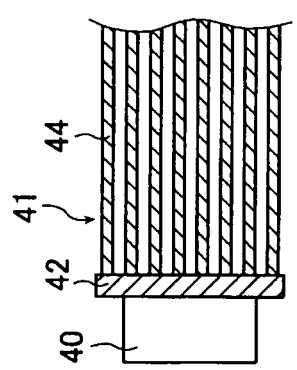
FIG. 4B is a cross-sectional view of the light source illustrated in FIG. 4A.
Figure 4D:
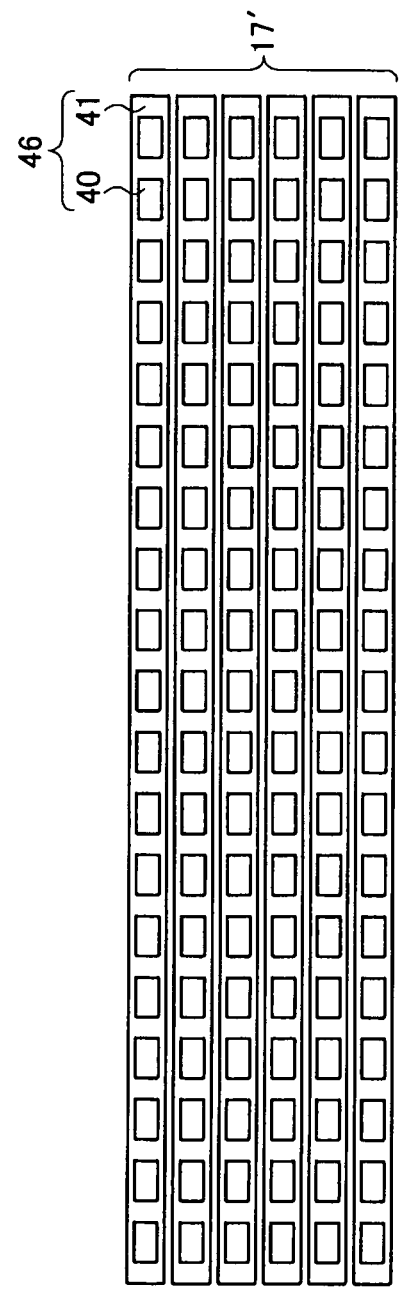
FIG. 4D is a schematic front view illustrating the configuration of another example of the light source.

FIG. 4A is a perspective view schematically illustrating a configuration of the light source 17 of the planar lighting device 10 of FIGS. 1 and 2; FIG. 4B is a cross-sectional view of the light source 17 illustrated in FIG. 4A; and FIG. 4C is a schematic perspective view illustrating only one LED chip of the light source 17 of FIG. 4A as enlarged.

As illustrated in FIG. 4A, the light source 17 comprises a plurality of light emitting diode chips (referred to as "LED chips" below) 40 and a light source mount 41.

The LED chip 40 is a chip of a light emitting diode emitting blue light, the surface of which has a fluorescent substance applied thereon. It has a light emission surface 40a having a given area, through which white light is emitted.

Specifically, when blue light emitted through the surface of the light emitting diode of the LED chip 40 is transmitted through the fluorescent substance, the fluorescent substance generates fluorescence. Thus, when blue light emitted by the LED chip 40 is transmitted through the fluorescent substance, the blue light emitted by the light emitting diode and the light radiated as the fluorescent substance generate fluorescence blend to produce and emit white light.

The LED chip 40 may for example be formed by applying a YAG (yttrium aluminum garnet) base fluorescent substance to the surface of a GaN base light emitting diode, an InGaN base light emitting diode, etc.

As illustrated in FIG. 4B, the light source mount 41 comprises an array base 42 and a plurality of fins 44. The aforementioned plurality of LED chips 40 is disposed on the array base 42 in a row at a predetermined spacing. Specifically, the plurality of LED chips 40 is arrayed along the length of a light entrance plane 18d of the light guide plate 18 to be described later, that is, parallel to a line in which a light exit plane 18a and a light entrance plane 18d meet.

The array base 42 is a plate-shaped member having one surface positioned opposite the light entrance plane 18d of the light guide plate 18. The LED chips 40 are carried on a lateral plane of the array base 42 facing the light entrance plane 18d of the light guide plate 18.

The array base 42 according to the embodiment under discussion is formed of a metal having a good heat conductance as exemplified by copper and aluminum. The array base 42 also acts as a heat sink to absorb heat generated by the LED chips 40 and releases the heat to the outside.

The plurality of fins 44 is plate members each formed of a metal having a good heat conductance as exemplified by copper and aluminum. The fins 44 are connected to the array base 42 on the side thereof opposite from the LED chips 40 and spaced a given distance from neighboring fins 44.

The plurality of fins 44 is provided on the light source mount 41, making it possible to widen the surface area and increase the heat release effect. With this arrangement, it is possible to increase the cooling efficiency of the LED chip 40.

The heat sink may be not only of an air-cooled type but also of a water-cooled type.

While the embodiment under discussion uses the array base 42 of the light source mount 41 as a heat sink, a plate member without a heat-releasing function may be used to form the array base in place of the array base having a function of a heat sink, where the LED chips need not to be cooled.

As illustrated in FIG. 4C, the LED chips 40 of the embodiment under discussion each have a rectangular shape such that the sides perpendicular to the direction in which the LED chips 40 are arrayed are shorter than the sides lying in the direction in which the LED chips 40 are arrayed or, in other words, the sides lying in the direction of thickness of the light guide plate 18 to be described, i.e., the direction perpendicular to the light exit plane 18a, are the shorter sides. Expressed otherwise, the LED chips 40 each have a shape defined by b>a where "a" denotes the length of the sides perpendicular to the light exit plane 18a of the light guide plate 18 and "b" denotes the length of the sides in the array direction. Now, given "q" as the distance by which the arrayed LED chips 40 are spaced apart from each other, then q>b holds. Thus, the length "a" of the sides of the LED chips 40 perpendicular to the light exit plane 18a of the light guide plate 18, the length "b" of the sides in the array direction, and the distance "q" by which the arrayed LED chips 40 are spaced apart from each other preferably have a relationship satisfying q>b>a.

With the LED chips 40 each having such a rectangular shape, a thinner light source may be provided while generating a larger amount of light, thereby making it possible to reduce the thickness of the planar lighting device. Further, the rectangular shape also makes it possible to decrease the number of LED chip arrays, thereby decreasing costs.

While each of the LED chips 40 preferably has a rectangular shape with the shorter sides lying in the direction of the thickness of the light guide plate 18 for a thinner design of the light source, the present invention is not limited thereto, allowing the LED chips to have any shape as appropriate such as a square, a circle, a polygon, and an ellipse.

Further, while the LED chips are arranged in one row and have a single-layer structure in this embodiment, the present invention is not limited thereto, allowing use of a multi-layered LED array having a plurality of LED arrays 46 of a structure wherein the plurality of LED chips 40 is stacked on the array base 42 as a light source 17'. Even in a case where the LED arrays 46 are thus stacked, a larger number of LED arrays 46 can be stacked while reducing the thickness of the light source by giving each of the LED chips 40 a rectangular shape and reducing the thickness of the LED arrays 46. Furthermore, where the LED arrays 46 are stacked to form a multi-layer structure, that is to say, where more LED arrays (LED chips) are packed into a given space, a larger amount of light can be generated. Preferably, the above inequality also applies to the distance separating the LED chips of one LED array from the LED chips of the other LED arrays in adjacent layers. Expressed otherwise, the LED arrays preferably are stacked such that the LED chips are spaced a given distance apart from the LED chips of the LED arrays in adjacent layers.

Now, the light guide plate 18 will be described.

Figure 5:
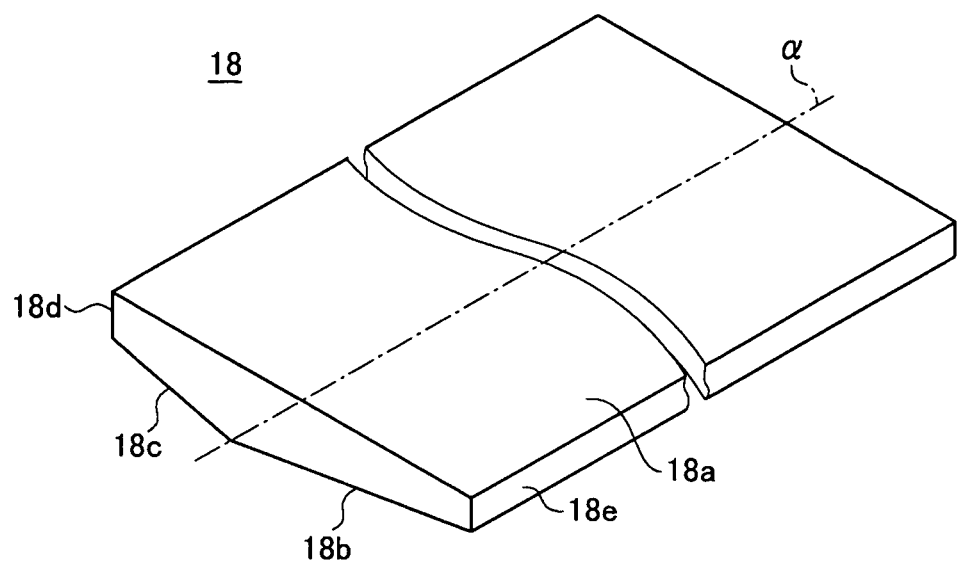
FIG. 5 is a schematic perspective view illustrating the shape of the light guide plate.

FIG. 5 is a perspective view schematically illustrating the shape of the light guide plate 18.

The light guide plate 18, as illustrated in FIG. 2, FIG. 3, and FIG. 5, comprises the flat light exit plane 18a of a substantially rectangular shape, the light entrance plane 18d formed on one end of the light exit plane 18a substantially orthogonal to the light exit plane 18a, an end plane 18e formed on another end of the light exit plane 18a parallel to the light entrance plane 18d, and two rear planes [a first inclined plane (first rear plane) 18b and a second inclined plane (second rear plane) 18c] positioned on the opposite side of the light exit plane 18a, that is, on the rear side of the light guide plate and inclined at a predetermined angle with respect to the light exit plane 18a.

The first inclined plane 18b is inclined so as to become farther and farther away from the light exit plane 18a, that is, so as to increase in distance from the light exit plane 18a, as the distance increases from the end plane 18e. That is, the first inclined plane 18b is inclined so as to increase the thickness of the light guide plate in the direction orthogonal to the light exit plane as the distance increases from the end plane 18e.

The second inclined plane 18c is inclined so as to become farther and farther away from the light exit plane 18a, that is, so as to increase in distance from the light exit plane 18a, as the distance increases from the light entrance plane 18d. That is, the second inclined plane 18c is inclined so as to increase the thickness of the light guide plate in the direction orthogonal to the light exit plane as the distance increases from the light entrance plane 18d.

The light guide plate 18, as illustrated in FIG. 3A, is formed so that, given a joining line α as a line that passes through the section joining the first inclined plane 18b and the second inclined plane 18c and is parallel to the connecting line of the light exit plane 18a and the light entrance plane 18d (or the connecting line of the light entrance plane 18a and the end plane 18e) (refer to FIG. 1, FIG. 3, and FIG. 5), a distance $L_1$ in the direction orthogonal to the light entrance plane 18d of the light guide plate 18 (hereinafter referred to as "the direction of the optical axis" as well) from the light entrance plane 18d to the joining line α, and a distance $L_2$ in the direction of the optical axis from the end plane 18e to the joining line α, the relationship $L_1/L_2=\frac{1}{2}$ is satisfied in the example shown in the figure. That is, the ratio of the distance from the joining line α to the light entrance plane 18d to the distance from the joining line α to the end plane 18e is 1:2. In other words, the second inclined plane 18c and the first inclined plane 18b each are formed so that the ratio of the distances in the direction of the optical axis from the light entrance plane 18d and the end plane 18e to the joining line α is 1:2.

Further, the first inclined plane 18b and the second inclined plane 18c are each inclined with respect to the light exit plane 18a. As a result, the section of the joining line α of the rear plane of the light guide plate 18 is the thickest section.

Furthermore, in the present invention, while the shape of the light guide plate is acceptable as long as the relationship of the aforementioned $L_1$ and $L_2$ is $L_1<L_2$, a shape where $L_1/L_2=\frac{1}{2}$ is more preferable, as in the example shown in the figure.

The light guide plate 18 is thus thinnest at the end plane 18e and thickest at the location where the first inclined plane 18b and the second inclined plane 18c join, that is, at the position of the joining line α. In other words, the light guide plate 18 thickens in the direction orthogonal to the light exit plane 18a thereof, from the light entrance plane 18d or the end plane 18e toward the joining line α.

Further, in the light guide plate 18, the surface area of the light entrance plane 18d is greater than the surface area of the end plane 18e.

The aforementioned light source 17 is disposed opposite the light entrance plane 18d of the light guide plate 18. In this embodiment, the length of the light emission surface 40a of the LED chips 40 of the light source 17 is substantially the same as the length of the light entrance plane 18d in the direction orthogonal to the light exit plane 18a.

With the rear plane comprising a first inclined plane and a second inclined plane in this manner and the thickness of the part on the side of the light guide plate closer to the light entrance plane increasing as the distance from the light entrance plane increases, the light entered through the light entrance plane reaches a location farther from the light entrance plane, making it possible to increase the size of the light exit plane.

Further, increasing the surface area of the light entrance plane 18d of the light guide plate 18 makes it possible to arrange a greater number of light sources or a larger sized light source so as to increase the amount of light entering the light entrance plane. With the amount of light entering the light guide plate increased in this manner, that is, with a large amount of light obtainable, it is possible to emit light having higher brightness or higher illuminance through the light exit plane.

Furthermore, in the planar lighting device of the present invention having the above-described light guide plate 18, the light entrance plane is provided on only one end of the light guide plate, making it possible to reduce the number of LEDs and thus reduce costs in comparison to a planar lighting device wherein a light entrance plane is formed on both ends of the light guide plate and a light source is arranged opposite each of the light entrance planes, for example.

With the light guide plate 18 illustrated in FIG. 2, the light entered through the light entrance plane 18d is scattered by a scatterer (described in detail later) included inside the light guide plate 18, passes through the inside of the light guide plate 18, and either directly or upon reflection by the first inclined plane 18b, the second inclined plane 18c, and the end plane 18e exits through the light exit plane 18a. While a portion of light sometimes leaks from the first inclined plane 18b, the second inclined plane 18c, and the end plane 18e at this time, the leaked light is reflected by the reflection plate 28 covering the first inclined plane 18b, the second inclined plane 18c, and the end plane 18e of the light guide plate 18, and once again enters the light guide plate 18. The reflection plate 28 will be described later in detail.

The light guide plate 18 is formed of a transparent resin into which scattering particles are kneaded and dispersed. Transparent resin materials that may be used to form the light guide plate 18 include optically transparent resins such as PET (polyethylene terephthalate), PP (polypropylene), PC (polycarbonate), PMMA (polymethyl methacrylate), benzyl methacrylate, MS resins, and COP (cycloolefin polymer). The scattering particles kneaded and dispersed into the light guide plate 18 may be formed, for example, of TOSPEARL (trademark), silicone, silica, zirconia, or a derivative polymer. The light guide plate 18 containing the scattering particles is capable of emitting uniform illumination light through the light exit plane with a greatly reduced level of brightness unevenness. The light guide plate 18 so formed may be manufactured using an extrusion molding method or an injection molding method.

Given a scattering cross-section Φ of the particles included in the light guide plate 18, a length L of the light guide plate 18 (from the light entrance plane 18d to the end plane 18e) in the incident direction (the direction parallel to the light exit plane, orthogonal to the line connecting the light exit plane and light entrance plane; the direction of the optical axis), a density $N_p$ of scattering particles P included in the light guide plate 18 (number of particles per volume), and a compensation coefficient $K_c$, the scattering particles P preferably satisfy a relationship where the value of $\Phi \cdot N_p \cdot L \cdot K_c$ is greater than or equal to 1.1 and less than or equal to 8.2, and the value of the compensation coefficient $K_c$ is greater than or equal to 0.005 and less than or equal to 0.1. The light guide plate 18, containing scattering particles P satisfying the above relationship, is capable of emitting uniform illumination light through the light exit plane 30a with a greatly reduced level of brightness unevenness.

When parallel rays of light are caused to enter an isotropic medium, a transmittance T is generally expressed according to the Lambert-Beer law by the following expression (1):

$$T = I/I_o = \exp(-\rho \cdot x) \qquad (1)$$

where x is a distance, $I_o$ an intensity of incident light, I an intensity of outgoing light, and ρ an attenuation constant.

The above attenuation constant ρ can be expressed using the scattering cross-section of particles Φ and the number of particles $N_p$ in unit volume contained in the medium as follows:

$$\rho = \Phi \cdot N_p \qquad (2)$$

Thus, given a length L from the entrance plane to the end plane of the light guide plate in the direction parallel to the travel direction of the light of the light guide plate, that is, a length L in the direction of the optical axis of the light guide plate, a light extraction efficiency $E_{out}$ is expressed by expression (3) below.

The light extraction efficiency $E_{out}$ is a ratio of light reaching the position spaced apart from the light entrance plane of the light guide plate by the length L in the direction of the optical axis to the incident light. In the case of the light guide plate 18 illustrated in FIG. 2, for example, the light extraction efficiency $E_{out}$ is a ratio of light reaching the end plane (the plane opposite the light entrance plane) to the light entering the light entrance plane.

$$E_{out} \propto \exp(-\Phi \cdot N_p \cdot L) \qquad (3)$$

Here, the expression (3) applies to a space of limited dimensions. Introducing the compensation coefficient $K_C$ therein to correct the relationship with the expression (1), the light extraction efficiency $E_{out}$ is expressed by the following expression (4).

$$E_{out} = \exp(-\Phi \cdot N_p \cdot L \cdot K_C) \qquad (4)$$

According to the expression (4), when $\Phi \cdot N_P \cdot L \cdot K_C$ is 3.5, the light extraction efficiency $E_{out}$ is 3%. When $\Phi \cdot N_p \cdot L \cdot K_C$ is 4.7, the light extraction efficiency $E_{out}$ is 1%.

The results show that the light extraction efficiency $E_{out}$ decreases as $\Phi \cdot N_p \cdot L \cdot K_C$ increases. The light extraction efficiency $E_{out}$ decreases in such a manner presumably because light is scattered increasingly as it travels in the direction of the optical axis of the light guide plate.

It follows, therefore, that the greater the value $\Phi \cdot N_p \cdot L \cdot K_C$ is, the more preferable it is as a property for the light guide plate. When $\Phi \cdot N_p \cdot L \cdot K_C$ is great, light exiting through a plane opposite the light entrance plane can be reduced whereas light emitted through the light exit plane can be increased. Expressed otherwise, when $\Phi \cdot N_p \cdot L \cdot K_C$ is great, the ratio of light emitted through the light exit plane to the light incident on the light entrance plane (hereinafter expressed as "light use efficiency" as well) can be increased. Specifically, a light use efficiency as high as 50% or more is achieved when $\Phi \cdot N_p \cdot L \cdot K_C$ is 1.1 or greater.

While light emitted through the light exit plane 18a of the light guide plate 18 increasingly exhibits illuminance unevenness as $\Phi \cdot N_p \cdot L \cdot K_C$ increases, the illuminance unevenness can be held to under a given, tolerable level by holding the value $\Phi \cdot N_p \cdot L \cdot K_C$ to 8.2 or less. Note that illuminance and brightness can be treated substantially equally. Thus, it is assumed that brightness and illuminance possess similar tendencies in the present invention.

Thus, the value $\Phi \cdot N_p \cdot L \cdot K_C$ of the light guide plate 18 of the invention is preferably not less than 1.1 and not greater than 8.2, and more preferably not less than 2.0 and not greater than 8.0. Still more preferably, the value $\Phi \cdot N_p \cdot L \cdot K_C$ is not less than 3.0 and, most preferably, not less than 4.7.

The compensation coefficient $K_C$ is preferably not less than 0.005 and not greater than 0.1, thus $0.005 \leq K_C \leq 0.1$.

Setting $\Phi \cdot N_p \cdot L \cdot K_C$ to no less than 1.1 makes it possible to increase light use efficiency, specifically, to increase light use efficiency to 50% or more, and setting $\Phi \cdot N_p \cdot L \cdot K_C$ to no more than 8.2 makes it possible to decrease illuminance unevenness to under a given, tolerable level.

It is also shown that given $K_c$ of 0.005 or more, a high light use efficiency is achieved, and given $K_c$ of 0.1 or less, the illuminance unevenness observed in light emitted through the light guide plate can be minimized.

Next, the optical member unit 20 will be described.

The optical member unit 20 serves to reduce the brightness unevenness of the illumination light emitted through the light exit plane 18a of the light guide plate 18 to achieve emission of illumination light with reduced brightness unevenness through a light exit plane 14a of the lighting device main body 14. As illustrated in FIG. 2, the optical member unit 20 comprises a diffusion sheet 20a for diffusing the illumination light emitted through the light exit plane 18a of the light guide plate 18 to reduce brightness unevenness, a prism sheet 20b having micro prism arrays formed parallel to the line where the light exit plane and the light entrance planes meet, and a diffusion sheet 20c for diffusing the illumination light emitted through the prism sheet 20b to reduce brightness unevenness.

The diffusion sheets 20a and 20c and the prism sheet 20b may be provided by making use, for example, of the diffusion sheets and the prism sheets disclosed in paragraphs [0028] through [0033] of JP 2005-234397 A by the Assignee or the Applicant of the present application.

While the optical member unit in the embodiment under discussion comprises the two diffusion sheets 20a and 20c and the prism sheet 20b between the two diffusion sheets, there is no specific limitation to the order in which the prism sheet and the diffusion sheets are arranged or the number thereof to be provided. Nor are the prism sheet and the diffusion sheets specifically limited, and use may be made of various optical members, provided that they are capable of reducing the brightness unevenness of the illumination light emitted through the light exit plane 18a of the light guide plate 18.

For example, the optical members may also be formed of transmittance adjusting members each comprising a number of transmittance adjusters consisting of diffusion reflectors distributed according to the brightness unevenness in addition to or in place of the diffusion sheets and the prism sheet described above.

Now, the reflection plate 28 forming part of the lighting device main body will be described.

The reflection plate 28 is formed in a shape corresponding to the first inclined plane 18b, the second inclined plane 18c, and the end plane 18e of the light guide plate 18 so as to cover the first inclined plane 18b, the second inclined plane 18c, and the end plane 18e. That is, the reflection plate 28 is disposed on the side opposite the light exit plane 18a of the light guide plate 18, in a shape that follows along the first inclined plane 18b, the second inclined plane 18c, and the end plane 18e.

The reflection plate 28 is formed by a member that reflects light, and thus reflects light that leaks from the first inclined plane 18b, the second inclined plane 18c, and the end plane 18e of the light guide plate 18 so that the light is once again entered the light guide plate 18.

With this reflection plate 28 thus arranged opposite the first inclined plane 18b, the second inclined plane 18c, and the end plane 18e of the light guide plate 18 so as to reflect the light leaked from the first inclined plane 18b, the second inclined plane 18c, and the end plane 18e of the light guide plate 18 so that the reflected light is re-entered the light guide plate 18, it is possible to improve the light use efficiency.

The reflection plate 28 may be formed of any material as desired, provided that it is capable of reflecting light leaking through the rear plane (the first inclined plane 18b and the second inclined plane 18c) and the end plane of the light guide plate 18. The reflection plate 28 may be formed, for example, of a resin sheet produced by kneading, for example, PET or PP (polypropylene) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

Next, the housing 16 will be described.

As illustrated in FIG. 2, the housing 16 accommodates and secures therein the lighting device main body 14 by holding it from above and both sides thereof, i.e., the light exit plane 14a and the first inclined plane 18b and the second inclined plane 18c of the light guide plate 18. The housing 26 comprises the lower housing 22, the upper housing 24, and the turnup members 26.

Figure 6A:
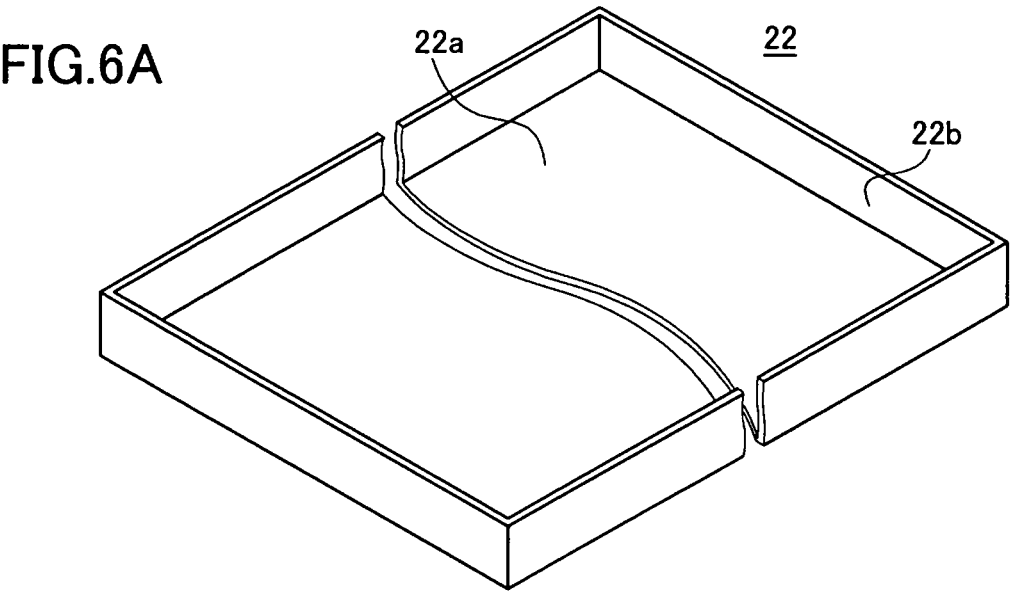
FIG. 6A is a schematic perspective view illustrating the shape of the lower housing.
Figure 6B:
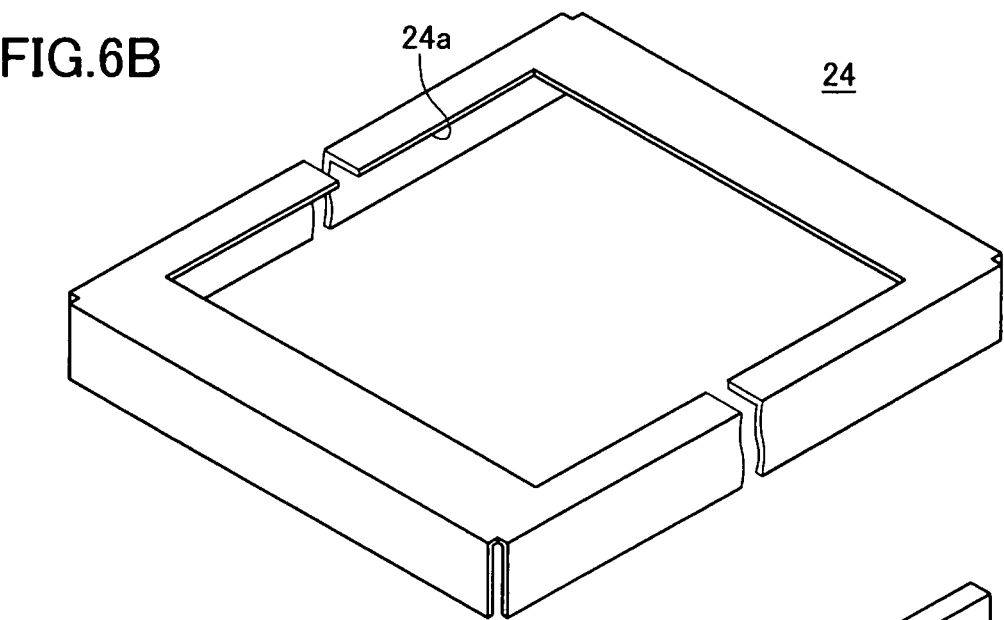
FIG. 6B is a schematic perspective view illustrating the shape of the upper housing.
Figure 6C:
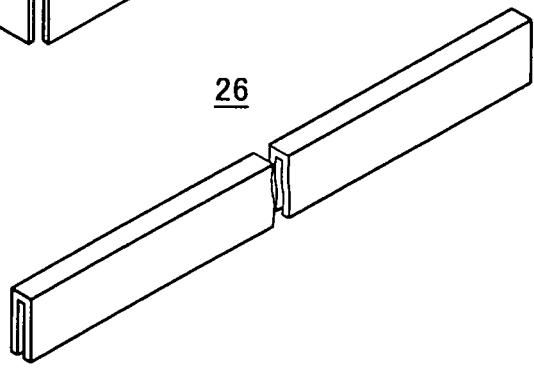
FIG. 6C is a schematic perspective view illustrating the shape of the turnup member.

FIG. 6A is a schematic perspective view illustrating the shape of the lower housing; FIG. 6B is a schematic perspective view illustrating the shape of the upper housing; and FIG. 6C is a schematic perspective view illustrating the shape of the turnup member.

The lower housing 22 has a shape comprising an open top section, a bottom section 22*a*, and lateral sections 22*b* provided on the four sides of the bottom section 22*a*, orthogonal to the bottom section 22*a*. Briefly, it has substantially the shape of a rectangular box open on one side.

As illustrated in FIG. 2, the bottom section 22*a* and the lateral sections 22*b* of this lower housing 22 support the lighting device main body 14 placed therein from above on the underside and on the lateral sides and covers the faces of the lighting device main body 14 except the light exit plane 14*a*, i.e., the plane opposite from the light exit plane 14*a* of the lighting device main body 14 (rear side) and the lateral sections.

The upper housing 24 has a shape wherein a rectangular opening that is smaller than the rectangular light exit plane 14*a* of the light device main body 14 and serves as an opening 24*a* is formed on the top section, and the bottom section is open.

As illustrated in FIG. 2, the upper housing 24 is placed from above the lighting device main body 14 and the lower housing 22, that is, from the light exit plane side, to cover the lighting device main body 14 and the lower housing 22, which holds the former, as well as four lateral sections 22*b*.

Further, the turnup member 26, as illustrated in FIG. 6C, has a shape wherein the shape of the cross-section orthogonal to a predetermined direction has always the same U-shaped profile. That is, each turnup member 46 is a bar-shaped member having a U-shaped profile in cross section perpendicular to the direction in which it extends.

As illustrated in FIG. 2, the turnup members 26 are fitted between the lateral sections of the lower housing 22 and the lateral sections of the upper housing 24 such that the outer face of one of the parallel sections of said U shape connects with lateral sections 22*b* of the lower housing 22 whereas the outer face of the other parallel section connects with the lateral sections of the upper housing 24.

To connect the lower housing 22 with the turnup members 26 and the turnup members 26 with the upper housing 24, any known method may be used such as a method using bolts and nuts and a method using bonds.

With the turnup members 26 thus arranged, the rigidity of the housing 16 increases, thereby preventing warping of the light guide plate. As a result, for example, light can be efficiently emitted without, or with a greatly reduced level of, brightness unevenness. Further, even where the light guide plate used is liable to develop a warp, the warp can be corrected with an increased certainty or the warping of the light guide plate can be prevented with an increased certainty, thereby allowing light to be emitted through the light exit plane without brightness unevenness or with a greatly reduced level of brightness unevenness.

Furthermore, a variety of material such as metal or resin may be used for the upper housing, lower housing, and turnup members of the housing. The material used is preferably light in weight and very strong.

The planar lighting device 10 of this embodiment has further arranged the light guide plate mount 30 between the lower housing 22 and the reflection plate 28. The light guide plate mount 30 is formed from a resin such as polycarbonate, and comes in contact with the lower housing 22 and the reflection plate 28.

Further, on the rear side of the lower housing 22 is installed the power unit casing 32 (refer to FIG. 1) that stores the power source (not shown) of the light source 17.

The planar lighting device 10 is basically configured as described above.

In the planar lighting device 10, light emitted by the light source 17 positioned on one end of the light guide plate 18 enters the light entrance plane 18*d* of the light guide plate 18, passes through the light guide plate 18 while scattering the light using a scatterer included inside the light guide plate 18, and directly or upon reflection by the first inclined plane 18*b*, the second inclined plane 18*c*, and the end plane 18*e* emits from the light exit plane 18*a*. In the process, part of the light leaking through the first inclined plane 18*b*, the second inclined plane 18*c*, and the end plane 18*e* is reflected by the reflection plate 28 to enter the light guide plate 18 again.

Thus, light emitted through the light exit plane 18*a* of the light guide plate 18 is transmitted through the optical member unit 20 and emitted through the light exit plane 14*a* of the lighting device main body 14 to illuminate the liquid crystal display panel 4.

The liquid crystal display panel 4 uses the drive unit 6 to control the transmittance of the light according to the position so as to display characters, figures, images, etc. on its surface.

Thus, when the shape of the light guide plate is configured in such a manner that the thickest section is formed closer to the section of the light entrance plane than the center of the light guide plate (so that $L_1/L_2=\frac{1}{2}$ in the present embodiment) and the light enters from only one end of the light guide plate, as in the light guide plate 18 of the invention, it is possible to increase the overall brightness of the light emitted through the light exit plane, efficiently utilize the light emitted by the light source, and emit light with reduced or no brightness unevenness through the light exit plane. Further, because the light that enters through the light entrance plane travels to a location farther than the light entrance plane, it is possible to increase the size of the light entrance plane.

Additionally, according to the planar lighting device that employs a light guide plate of such a shape, the thickest section (the section of the joining line α) of the light guide plate 18 is formed at a section closer to the light entrance plane than the center of the light guide plate, making it possible to achieve a bell-shaped distribution of the brightness of the light emitted through the light exit plane, where the brightness gradually increases toward the center region, even in a case where light is entered through only one end of the light guide plate.

This arrangement makes it possible to maximize the brightness of the center region of the light exit plane, that is, establish the peak of the brightness distribution at the center of the light exit plane, thereby improving the clarity of the image displayed at the center of the liquid crystal display device, which is generally the location that draws most attention. Also, visually it appears as if a uniform light is being emitted through the light exit plane. Furthermore, the planar lighting device of the invention is capable of emitting light with a brightness distribution that is suitable for use in liquid crystal televisions and the like.

Furthermore, since the surface area of the light entrance plane of the light guide plate is made greater than the surface area of the end plane, the light guide plate is not thickened and a greater number of light sources or a larger sized light source can be arranged, making it possible to increase the amount of light entered through the light entrance plane and, in turn, provide a planar lighting device capable of emitting a large amount of light while achieving reduced thickness and reduced weight.

Further, the planar lighting device of the invention provides a light entrance plane on only one end of the light guide plate, making it possible to establish a light source on only one side of the light guide plate so as to reduce costs.

Further, the light guide plate may be manufactured by cutting one end of a light guide plate having a symmetrical shape, or the light guide plate having the shape illustrated in FIG. 2, FIG. 3, and FIG. 5 may be manufactured using an extrusion molding method or injection molding method.

A specific example of the planar lighting device of the invention will now be described in further detail.

In this specific example, the brightness distribution of the light emitted through the light exit plane of the planar lighting device of the invention was measured. Also, for comparison purposes, a planar lighting device having a symmetrical light guide plate was used, and the brightness distribution of light emitted by the light exit plane of this planar lighting device was also measured.

First, in measurement example 1, the light guide plate 18 used was a light guide plate having a length L of the direction of the optical axis, that is, a length L from the light entrance plane 18d to the end plane 18e, of 480 mm, a length d1 of the light entrance plane 18d in the direction orthogonal to the light exit plane of 3 mm, a length d2 of the end plane 18e in the direction orthogonal to the light exit plane of 2 mm, a length D from the light exit plane to the rear plane of the joining line α, that is, a thickness D of the thickest section, of 4 mm, a distance $L_1$ from the light entrance plane 18d to the joining line α of 160 mm, and a distance $L_2$ from the end plane 18e to the joining line α of 320 mm.

The weight ratio of the scattering particles mixed into the light guide plate to the light guide plate was 0.07 Wt %.

The brightness distribution of the light emitted through the light exit plane of the planar lighting device comprising the light guide plate 18 of such a shape was measured.

In measurement example 2, the light guide plate used was light guide plate having a length L in the direction of the optical axis of 480 mm, a length d1 of the light entrance plane in the direction orthogonal to the light exit plane of 2 mm, a length d2 of the end plane in the direction orthogonal to the light exit plane of 2 mm, a length D from the light exit plane to the rear plane of the joining line α of 4 mm, a distance $L_1$ of the light guide plate from the light entrance plane to the joining line α of 240 mm, and a distance $L_2$ from the end plane to the joining line α of 240 mm, that is, a light guide plate that is symmetrical with respect to the axis that passes through the first inclined plane and the second inclined plane and is orthogonal to the light exit plane.

In measurement example 2 as well, the weight ratio of the scattering particles mixed into the light guide plate to the light guide plate was 0.07 Wt %.

Thus, in measurement example 2, the brightness distribution of the light emitted through the light exit plane of the planar lighting device comprising a symmetrical light guide plate was measured.

For measurement example 3, a light guide plate having the same shape as that of measurement example 2 was used, and the brightness distribution of the light emitted through the light exit plane of a planar lighting device having a light source on both ends of the light guide plate, that is, a planar lighting device having a light entrance plane on the two opposing planes of the light guide plate, was measured.

Figure 7:
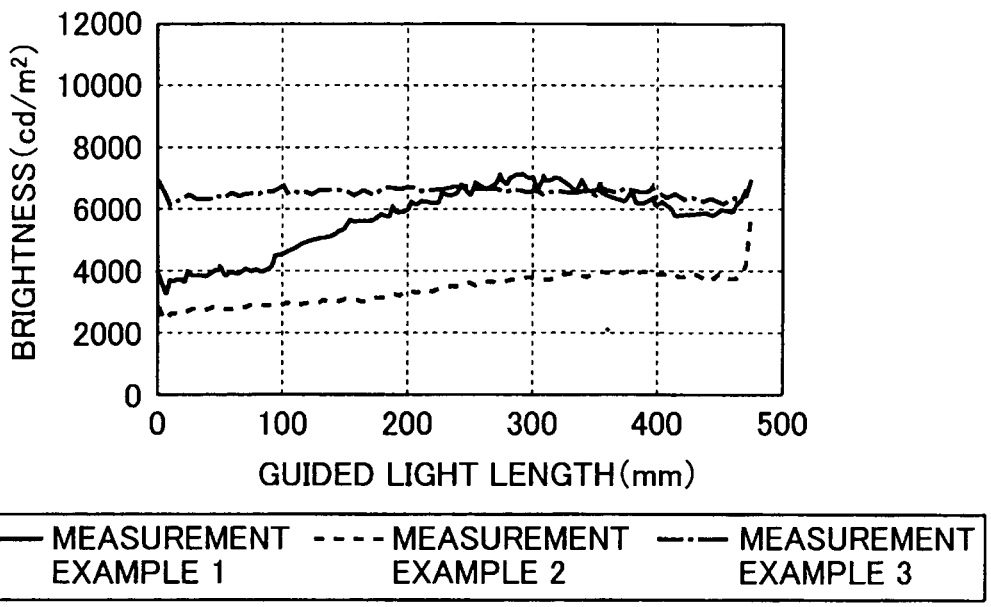
FIG. 7 is a diagram illustrating the relationship of brightness distribution between the light guide plate of the invention and a symmetrical light guide plate in a case where the weight ratio of scattering particles is 0.07 Wt %.

FIG. 7 shows the measurement results of measurement example 1 to measurement example 3. In FIG. 7, the horizontal axis indicates the distance from the light entrance plane in the direction of the optical axis, that is, the guided light length [mm], and the vertical axis indicates brightness [cd/m²].

Next, as measurement example 4, the brightness distribution of the light emitted through the light exit plane of a planar lighting device having the same configuration and shape as those of the planar lighting device of measurement example 1, except for a weight ratio of the scattering particles mixed into the light guide plate to the light guide plate of 0.10 Wt %, was measured.

Furthermore, as measurement example 5, the brightness distribution of the light emitted through the light exit plane of a planar lighting device having the same configuration and shape as those of the planar lighting device of measurement example 2, except for a weight ratio of the scattering particles mixed into the light guide plate to the light guide plate of 0.10 Wt %, was measured.

Figure 8:
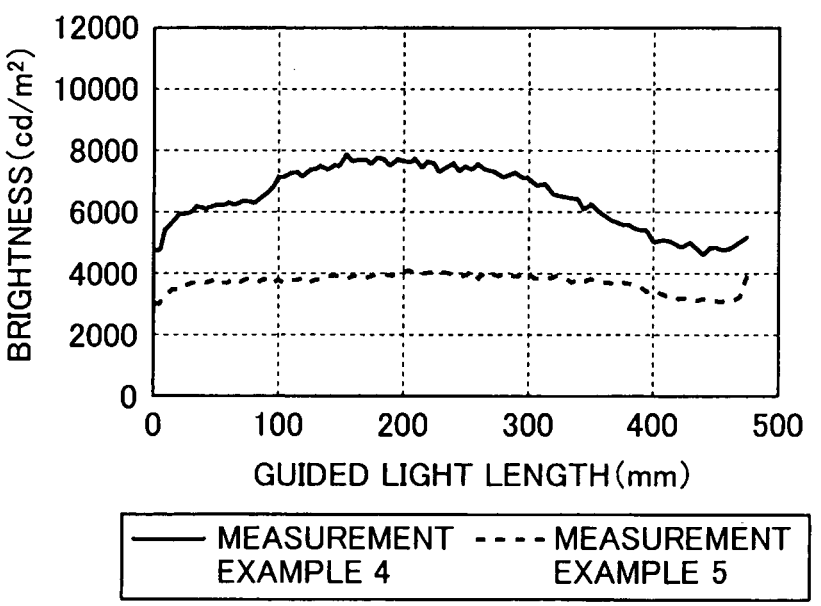
FIG. 8 is a diagram illustrating the relationship of brightness distribution between the light guide plate of the invention and a symmetrical light guide plate in a case where the weight ratio of scattering particles is 0.10 Wt %.

FIG. 8 shows the measurement results of measurement example 4 and measurement example 5. In FIG. 8, the horizontal axis indicates the distance from the light entrance plane in the direction of the optical axis, that is, the guided light length [mm], and the vertical axis indicates brightness [cd/m²].

Furthermore, as measurement example 6, the brightness distribution of the light emitted through the light exit plane of a planar lighting device having the same configuration and shape as those of the planar lighting device of measurement example 1, except for a weight ratio of the scattering particles mixed into the light guide plate to the light guide plate of 0.14 Wt %, was measured.

Furthermore, as measurement example 7, the brightness distribution of the light emitted through the light exit plane of a planar lighting device having the same configuration and shape as those of the planar lighting device of measurement example 2, except for a weight ratio of the scattering particles mixed into the light guide plate to the light guide plate of 0.14 Wt %, was measured.

Figure 9:
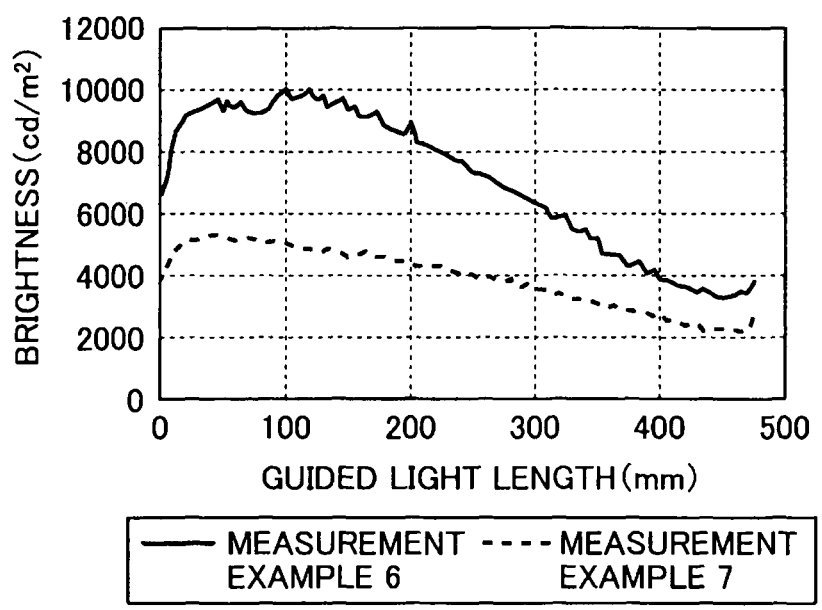
FIG. 9 is a diagram illustrating the relationship of brightness distribution between the light guide plate of the invention and a symmetrical light guide plate in a case where the weight ratio of scattering particles is 0.14 Wt %.

FIG. 9 shows the measurement results of measurement example 6 and measurement example 7. In FIG. 9, the horizontal axis indicates the distance from the light entrance plane in the direction of the optical axis, that is, the guided light length [mm], and the vertical axis indicates brightness [cd/m²].

From FIG. 7 to FIG. 9, it is understood that, regardless of the weight ratio of scattering particles, the brightness distribution of the light emitted through the light exit plane of planar lighting devices employing the light guide plate of the invention (measurement examples 1, 4, and 6) exhibits more of a bell shape, that is, exhibits a brightness that gradually increases toward the center region, compared to the brightness distribution of the light emitted through the light exit plane of planar lighting devices employing a symmetrical light guide plate (measurement examples 2, 5, and 7). It is also understood that, in cases where the light guide plate of the invention was used, the brightness of the light emitted through the light exit plane was generally higher.

Further, as shown in FIG. 7, it is understood that a planar lighting device that employs the light guide plate of the invention and is provided with a light source on one side only (measurement example 1) is capable of achieving more of a bell-shaped brightness distribution of the light emitted through the light exit plane than a planar lighting device that is provided with opposing light sources on both ends of the light guide plate and admits the light incidence through both ends (measurement example 3). That is, it is understood that the brightness of the light emitted through the center region of the light exit plane of a planar lighting device employing the light guide plate of the invention is higher than that of other sections.

From the above, the effect of the present invention is clear.

Further, given a thickness D1 of the light guide plate at the light entrance plane (entrance section thickness), a thickness D2 of the light guide plate at the thickest location of the light guide plate, that is, at the joining line α in the present embodiment, a thickness D3 of the light guide plate at the end plane, and a length $L_1$ from the entrance plane to the joining line α and a length $L_2$ from the end plane to the joining line α in the incident direction of the light guide plate, it is preferred that the light guide plate holds the following relationships:

$D1<D2$ and $$27/100000<(D2-D1)/L_1<5/100 \quad\quad (A); \text{ and}$$

$D3<D2$ and $$27/100000<(D2-D3)/L_2<5/100 \quad\quad (B); \text{ and}$$

that the ratio Npa of the weight of the scattering particles contained to the weight of the light guide plate satisfies a range:

$$0.04 \text{ Wt \%}<Npa<0.25 \text{ Wt \%}.$$

When a light guide plate having a shape that satisfies the above relationships is employed, the light emission efficiency can be increased to 30% or more. Further, while either relationship (A) or (B) may be satisfied, it is preferable that both relationships (A) and (B) are satisfied.

Further, it is more preferable that the light guide plate holds the following relationships:

$D1<D2$ and $$66/100000<(D2-D1)/L_1<26/1000 \quad\quad (C); \text{ and}$$

$D3<D2$ and $$66/100000<(D2-D3)/L_2<26/1000 \quad\quad (D); \text{ and}$$

that the ratio Npa of the weight of the scattering particles contained to the weight of the light guide plate satisfies a range:

$$0.04 \text{ Wt \%}<Npa<0.25 \text{ Wt \%}.$$

When a light guide plate having a shape that satisfies the above relationships is employed, the light emission efficiency can be increased to 40% or more. While either relationship (C) or (D) may be satisfied, it is more preferable that both relationships (C) and (D) are satisfied.

It is even more preferable that the light guide plate holds the following relationships:

$D1<D2$ and $$1/1000<(D2-D1)/L_1<26/1000 \quad\quad (E); \text{ and}$$

$D3<D2$ and $$1/1000<(D2-D3)/L_2<26/1000 \quad\quad (F); \text{ and}$$

that the ratio Npa of the weight of the scattering particles contained to the weight of the light guide plate satisfies a range:

$$0.04 \text{ Wt \%}<Npa<0.25 \text{ Wt \%}.$$

When a light guide plate having a shape that satisfies the above relationships is employed, the light emission efficiency can be increased to 50% or more. While either relationship (E) or (F) may be satisfied, it is more preferable that both relationships (E) and (F) are satisfied.

While in the above-described embodiment the relationship between the distance $L_1$ from the light entrance plane 18d to the joining line α and the distance $L_2$ from the end plane 18e to the joining line α of the light guide plate is $L_1/L_2=\frac{1}{2}$, that is, the shape satisfies the relationship $L_1:L_2=1:2$, the present invention is not limited thereto and, as long as the shape at least satisfies the relationship $L_1<L_2$, it is possible to increase the size of the light exit plane and achieve a bell-shaped brightness distribution of the light emitted through the light exit plane.

Further, to further increase the light exit plane and establish a more uniform bell-shaped brightness distribution of the light emitted through the light exit plane, the shape of the light guide plate is preferably formed so as to establish a relationship between the distance $L_1$ and the distance $L_2$ where $\frac{1}{3}\leq L_1/L_2\leq \frac{2}{3}$ or, more preferably, $L_1/L_2=\frac{1}{2}$ holds true, as in the present embodiment.

Note that the light guide plate is not limited to the aforementioned shape and prism arrays may be formed in the direction parallel to the light entrance plane 18d and the end plane 18e on the first inclined plane 18b and the second inclined plane 18c. Further, instead of such prism arrays, optical elements similar to prisms may be provided and arranged regularly. For example, elements having lens effects such as lenticular lenses, concave lenses, convex lenses, or optical elements in pyramidal shape may be formed on the inclined planes of the light guide plate.

Furthermore, the first inclined plane and the second inclined plane are preferably smoothly connected. That is, a part on the side of the first inclined plane closer to the joining line α and a part on the side of the second inclined plane closer to the joining line α are each preferably provided with a curved surface shape, specifically, a curved shape having as its center an arbitrary point on the plane that passes through the joining line α and is orthogonal to the light exit plane.

Furthermore, in such a light guide plate, given a radius of curvature $R_1$ and a radius of curvature $R_2$ of the curved shaped section on the side of the first inclined plane closer to the joining line α and of the curved shaped section on the side of the second inclined plane closer to the joining line α, respectively, the relationship between $R_1$ and $R_2$ is preferably $R_1<R_2$.

Figure 10:
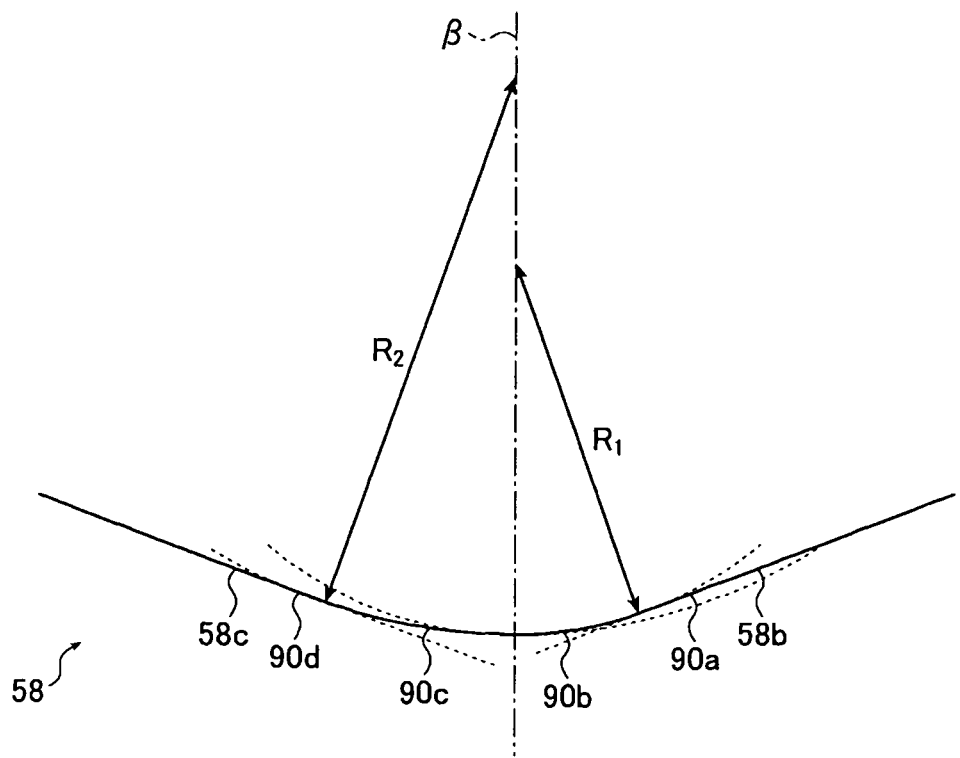
FIG. 10 is a cross-sectional view of the light guide plate of the invention in a case where the section joining the first inclined plane and the second inclined plane has a curved shape.

FIG. 10 shows an partial, enlarged cross-sectional view of an example of a light guide plate in a case where the side of the first inclined plane closer to the joining line α and the side of the second inclined plane closer to the joining line α are each given a curved shape.

A light guide plate 58 illustrated in FIG. 10 comprises the same configuration as the light guide plate 18 illustrated in FIGS. 2, 3, and 5, excluding the shapes of the parts on the side of the first inclined plane 18b and the second inclined plane 18c closer to the joining line α. Detailed descriptions thereof will therefore be omitted, and the unique points of the light guide plate 58 will be described.

The light guide plate 58, similar to the aforementioned light guide plate 18, comprises a light exit plane, a first inclined plane 58b, a second inclined plane 58c, a light entrance plane, and an end plane.

The first inclined plane 58b has a shape wherein the part on the side closer to the joining line α, that is, the part connected with the second inclined plane 58c is curved. That is, in the plane orthogonal to the joining line (connecting line) of the light exit plane and light entrance plane, the first inclined plane 58b comprises a first line 90a and a first arc 90b (curved shape). That is, in the plane orthogonal to the joining line (connecting line) of the light exit plane and the light entrance plane, the first inclined plane 58b comprises a part on the side closer to the joining line α that is an arc, and another part that is a line.

Given a plane β that passes through the joining line α and is orthogonal to the light exit plane, the curved surface constituting the part of the first inclined plane 58b that is closer to the joining line α has a curved shape having a radius of curvature $R_1$ with an arbitrary point on the plane β as its center.

The second inclined plane 58c comprises a shape wherein the part on the side closer to the joining line α has a curved shape. That is, in the plane orthogonal to the joining line (connecting line) of the light exit plane and light entrance plane, the second inclined plane 58c comprises a second line 90d and a second arc 90c (curved shape). That is, in the plane orthogonal to the joining line (connecting line) of the light exit plane and the light entrance plane, the second inclined plane 58c comprises a part on the side closer to the joining line α that is an arc, and another part that is a line.

The curved surface constituting the part of on the side of this second inclined plane 58c closer to the joining line α forms a curved shape having a radius of curvature $R_2$ with an arbitrary point on the plane β as its center.

Furthermore, the relationship between the radius of curvature $R_1$ of the first arc 90b of the first inclined plane 58b and the radius of curvature $R_2$ of the second arc 90c of the second inclined plane 58c satisfies the inequality $R_1 < R_2$.

Also, as shown in FIG. 10, the center point of the first arc 90b and the center point of the second arc 90c are positioned at different points on the plane β.

The side of the first inclined plane 58b closer to the joining line α and the side of the second inclined plane 58c closer to the joining line α are each thus formed into a curved shape, making it possible to smoothly connect the first inclined plane 58b and the second inclined plane 58c, prevent the occurrence of bright lines, dark lines, and the like in the joining line α section of the light guide plate, and emit more uniform light.

Furthermore, with the shape satisfying the relationship $R_1 < R_2$, it is possible to increase the brightness at the center of the light exit plane and create more of a bell-shaped brightness distribution of light emitted through the light exit plane. That is, it is possible to establish the center of the light exit plane as the location where the brightness of the light emitted through the light exit plane is brightest.

Figure 11:
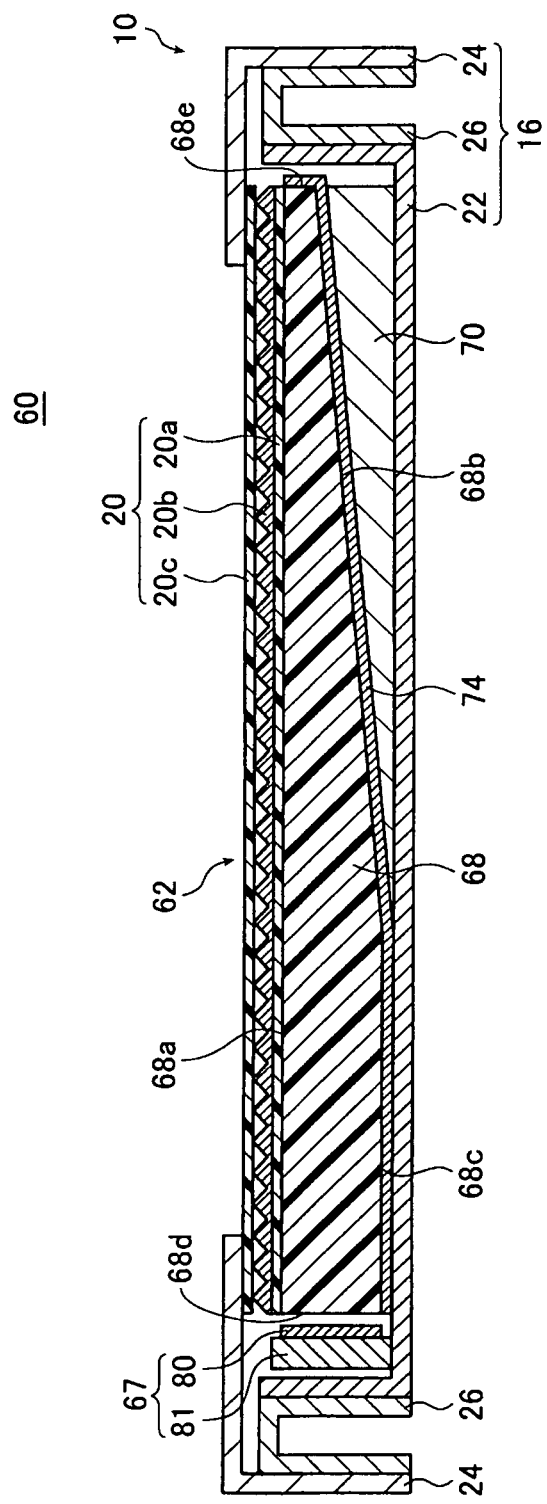
FIG. 11 is a cross-sectional view illustrating the schematic configuration of another example of the planar lighting device of the invention.

Further, while the second inclined plane of the light guide plate in the above embodiment is formed so as to incline with respect to the light exit plane, the second incline plane formed on the end side of the light entrance plane may be changed to a plane that is not inclined but rather parallel to the light entrance plane, for example. FIG. 11 is a schematic cross-sectional view of another example of the planar lighting device of the invention that employs such a light guide plate.

A planar lighting device 60 illustrated in FIG. 11 comprises the same configuration as that of the planar lighting device 10 illustrated in FIG. 1 and FIG. 2, excluding the shapes of a light source 67, a light guide plate 68, a reflection plate 74, and a light guide plate mount 70. Thus, the identical components in the figures are given the same reference numerals and the detailed descriptions thereof will be omitted. The following description focuses on the unique points of the planar lighting device 60.

The planar lighting device 60 has a lighting device main body 62 comprising the light source 67, the light guide plate 68, the reflection plate 74, and the optical member unit 20, and the housing 16 comprising the lower housing 22, the upper housing 24, the turnup member 26, and the light guide plate mount 70 disposed between the lower housing 22 and the light guide plate 74.

The light guide plate 68 comprises a light exit plate 68a, a light entrance plane 68d, an end plane 68e, a first rear plane 68b, and a second rear plane 68c. The light guide plate 68 has the same configuration as that of the light guide plate 18 illustrated in FIG. 2, excluding the light entrance plane 68d, the first rear plane 68b, and the second rear plane 68c, and descriptions thereof will be omitted.

The light guide plate 68 comprises a plane opposite the light exit plane 68a comprising the first rear plane 68b and the second rear plane 68c.

The first rear plane 68b comprises the same configuration as that of the first inclined plane 18b of the light guide plate 18, and inclines at a predetermined angle in a direction in which the distance from the light exit plane 68a increases as the distance from the end plane 68e increases.

The second rear plane 68c is formed parallel to the light exit plane 68a between the first rear plane 68b and the light entrance plane 68d of the plane on the side opposite the light exit plane 68a. That is, the light guide plate 68 has a shape in which the thickness in the direction orthogonal to the light exit plane 68a at the joining line α and the thickness of the light entrance plane 68d are equal.

Further, in the light guide plate 68, the ratio of the distance from the light entrance plane 68d to the joining line α and the distance from the end plane 68e to the joining line α is 1:2.

The light source 67 comprises a plurality of LED chips 80 and a light source mount 81. The light source 67 has the same configuration as that of the above-described light source 17, excluding the size of the light source mount 81 and the LED chips 80.

The LED chips 80 have a shape wherein the length in the direction orthogonal to the exit plane of the light emission face, that is, the length in the vertical direction in FIG. 11, and the length in the direction of the shorter side of the light entrance plane 68d, that is, the length in the vertical direction in FIG. 11, are the same.

Further, the light source mount 81 has a shape wherein the length in the direction orthogonal to the light exit plane is longer than the LED chip 80.

Thus by designing the second rear plane 68c that was formed in contact with the light entrance plane 68d on the side opposite the light exit plane 68a of the light guide plate 68 so that it is parallel to the light exit plane 68a, it is possible to further increase the size of the surface area of the light entrance plane 68d. As a result, the light emission face of the LED chips can be increased in size along with this light entrance plane 68d, making it possible to increase the amount of light emitted by the light source and further increase the brightness of the light emitted through the light exit plane.

The reflection plate 74 is formed using the same material as that of the reflection plate 28 illustrated in FIG. 2, and is formed into a shape that corresponds to the first rear plane 68b, the second rear plane 68c, and the end plane 68e of the light guide plate 68 so as to cover the first rear plane 68b, the second rear plane 68c, and the end plane 68e.

Further, in the planar lighting device 60 illustrated in FIG. 11, a light guide plate mount 70 is positioned between the lower housing 22 and the section of the reflection plate 74 that covers the first rear plane 68b. The light guide plate mount 70, similar to the light guide plate mount 30 illustrated in FIG. 2, is formed from a resin such as polycarbonate, and comes in contact with the lower housing 22 and the section of the reflection plate 74 that covers the first rear plane 68b. That is, the light guide plate mount 70 is positioned between the lower housing 22 and the reflection plate 74, and supports the light guide plate 68.

Since the light that enters through the light entrance plane is capable of reaching a position farther that the light entrance plane, making it possible to further increase the size of the light exit plane, the light guide plate is preferably shaped so that the thickness of the light guide plate increases from the light entrance plane toward the center of the light guide plate, as with the light guide plate 18 illustrated in FIG. 2, FIG. 3, and FIG. 5. Yet, even when the light guide plate is shaped as illustrated in FIG. 11, the surface area of the light entrance plane can be increased while maintaining thinness, thereby making it possible to admit a sufficient amount of light entering through the light entrance plane and obtain a large amount of light. This enables a reduced thickness of the light guide plate and a larger light exit plane to be achieved.

That is, the light exit plane can be increased in size and a light having high brightness and/or illuminance can be emitted through the light exit plane.

Further, in the light guide plate having the shape illustrated in FIG. 11, the surface area of the light entrance plane can be increased, making it possible to increase the size of the light emission face of the light source along with the light entrance plane and, as a result, generate a larger amount of light emitted by the light source and further increase the brightness of the light emitted through the light exit plane.

Again, with the light guide plate having the above shape, preferably the value $\Phi \cdot N_p \cdot L \cdot K_C$ is in the range of not less than 1.1 and not greater than 8.2, and $0.005 \leq K_C \leq 0.1$, where L is the length in the incident direction from the light entrance plane to the end plane. When the above ranges are satisfied, light can be emitted through the light exit plane with a reduced illuminance unevenness and a high light use efficiency.

While the planar lighting device of the invention has been described above in detail, the invention is not limited in any manner to the above embodiment and various improvements and modifications may be made without departing from the spirit of the present invention.

For example, while each LED chip of the light sources is formed by applying YAG fluorescent substance to the light emission face of a blue LED in the above embodiment, the LED chip may be formed otherwise without limitations to such a configuration. For example, the LED chip used herein may be formed using a different monochromatic LED such as a red LED or a green LED with a fluorescent substance.

Further, an LED unit formed using three kinds of LEDs, i.e., a red LED, a green LED, and a blue LED, may be used. In that case, light beams emitted by the three kinds of LEDs are blended to produce white light.

Alternatively, a semiconductor laser (LD) may be used instead of an LED.

Further, the light guide plate may be fabricated by mixing a plasticizer into the transparent resin.

Fabricating the light guide plate from a material thus prepared by mixing a transparent material and a plasticizer provides a flexible light guide plate, allowing the light guide plate to be deformed into various shapes. Accordingly, the surface of the light guide plate can be formed into various curved surfaces.

Where the light guide plate is given such flexibility, the light guide plate or the planar lighting device using the light guide plate can even be mounted to a wall having a curvature when used, for example, for a display board employing ornamental lighting (illuminations). Accordingly, the light guide plate can be used for a wider variety of applications and in a wider application range including ornamental lighting and POP (point-of-purchase) advertising.

Said plasticizer is exemplified by phthalic acid esters, or, specifically, dimethyl phthalate, diethyl phthalate (DEP), dibutyl phthalate (DBP), di(2-ethylhexyl)phthalate (DOP (DEHP)), di-n-octyl phthalate (DnOP), diisononyl phthalate (DINP), dinonyl phthalate (DNP), diisodecyl phthalate (DIDP), phthalate mixed-base ester ($C_6$ to $C_{11}$) (610P, 711P, etc.) and butyl benzyl phthalate (BBP). Besides phthalic acid esters, said plasticizer is also exemplified by dioctyl adipate (DOA), diisononyl adipate (DINA), dinormal alkyl adipate ($C_{6,8,10}$) (610A), dialkyl adipate ($C_{7,9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

INDUSTRIAL APPLICABILITY

The planar lighting device of the present invention can be used as a planar lighting device (backlight unit) employed in a liquid crystal display, overhead projector, advertising electric signs, indoor/outdoor lighting, and the like.

The invention claimed is:

1. A planar lighting device comprising:
   a light source that emits light; and
   a light guide plate disposed opposite said light source in which light emitted from said light source enters and is emitted therefrom as planar light, wherein:
   said light guide plate comprises a flat light exit plane that emits said planar light, a light entrance plane that is formed opposite said light source and includes one side of said light exit plane, an end plane that includes the opposite side to said one side of said light exit plane, and a rear plane formed on the side opposite said light exit plane;
   said rear plane comprises a first rear plane that is joined with said end plane and is smoothly inclined to said light exit plane so that the distance from said light exit plane increases as the distance from said end plane increases, and a second rear plane that is joined with said first rear plane, is joined with said light entrance plane and is smoothly inclined to said light exit plane so that the distance from said light exit plane increases as the distance from said light entrance plane increases;
   said first rear plane and said second rear plane are joined so as to form a joining line where the distance from said joining line to said light entrance plane is shorter than the distance from said joining line to said end plane, and the distance between said light exit plane and said rear plane is greatest at said joining line;
   said light guide plate is formed so that a part on the side of said first rear plane closer to said joining line and a part on the side of said second rear plane closer to said joining line each have a curved shape with an arbitrary point on a plane that passes through said joining line and is orthogonal to said light exit plane as its center;
   said light guide plate satisfies the inequality $R_1 < R_2$, given a radius of curvature $R_1$ of the curved shape of said first rear plane, and a radius of curvature $R_2$ of the curved shape of said second rear plane; and
   said light guide plate includes a plurality of scattering particles in its interior.

2. The planar lighting device according to claim 1, wherein said light entrance plane and said end plane of said light guide plate are orthogonal to said light exit plane and the length of said light entrance plane is longer than the length of said end plane in the direction orthogonal to said light exit plane.

3. The planar lighting device according to claim 1, wherein said light guide plate satisfies the inequality of $1/3 \leq L_1/L_2 \leq 2/3$, given a length $L_1$ (mm) from said joining line to said light entrance plane and a length $L_2$ (mm) from said joining line to said end plane, in the direction orthogonal to said one side and parallel to said light exit plane.

4. The planar lighting device according to claim 1, wherein given a density $N_p$ of said scattering particles, a length $L_1$ (mm) from said joining line to said light entrance plane and a length $L_2$ (mm) from said joining line to said end plane, a length D1 (mm) of said light entrance plane in the direction orthogonal to said light exit plane, a distance D2 (mm) between said joining line and said light exit plane in the direction orthogonal to said light exit plane, and a length D3 (mm) of said end plane in the direction orthogonal to said light exit plane, satisfies the following inequalities:

$$27/100000 < (D2-D1)/L_1 < 26/1000$$

$$27/100000 < (D2-D3)/L_2 < 26/1000$$

and $$0.04 \text{ Wt \%} < N_p < 0.25 \text{ Wt \%}.$$

5. The planar lighting device according to claim 1, wherein said light source comprises a plurality of LED chips and a mount that supports said LED chips; and said LED chips are arranged in arrays on the plane opposite said light entrance plane of said mount.

6. The planar lighting device according to claim 5, wherein each of said LED chips satisfies the inequality b>a, given a length "a" in the thickness direction of said light guide plate and a length "b" in the direction orthogonal to the thickness direction of said light guide plate.

* * * * *